United States Patent
Kandemir

(10) Patent No.: US 11,702,048 B2
(45) Date of Patent: Jul. 18, 2023

(54) BRAKING APPARATUS FOR A CHILDREN'S KICK SCOOTER

(71) Applicant: Alexander Kandemir, New York, NY (US)

(72) Inventor: Alexander Kandemir, New York, NY (US)

( * ) Notice: Subject to any disclaimer, the term of this patent is extended or adjusted under 35 U.S.C. 154(b) by 240 days.

(21) Appl. No.: 17/104,855

(22) Filed: Nov. 25, 2020

(65) Prior Publication Data

US 2022/0161768 A1    May 26, 2022

(51) Int. Cl.
*B60T 7/16*     (2006.01)
*B60T 1/04*     (2006.01)
(Continued)

(52) U.S. Cl.
CPC    *B60T 7/16* (2013.01); *B60T 1/04* (2013.01); *B62L 1/04* (2013.01); *B62L 3/00* (2013.01); *G08C 17/02* (2013.01); *B62K 3/002* (2013.01)

(58) Field of Classification Search
None
See application file for complete search history.

(56) References Cited

U.S. PATENT DOCUMENTS 531,418 A * 12/1894 Leonard .................... B61H 1/00
                                                                188/57
1,900,165 A *  3/1933 De Monge ............ B60T 13/243
                                                                91/468

(Continued)

FOREIGN PATENT DOCUMENTS

DE    102016114294 A1 *  2/2018    ............... B60T 7/16
EP       2489562 A1 *  8/2012    ............... B60T 7/16
(Continued)

OTHER PUBLICATIONS

Smart Brake—multi-purpose wireless brakes. [online] Rollersafe AS, Sep. 25, 2020 [retrieved on Nov. 22, 2020]. Retrieved from the Internet: <URL: https://mysmartbrake.com/smart-brake-multi-purpose-wireless-brakes/>.

(Continued)

*Primary Examiner* — Melanie Torres Williams
(74) *Attorney, Agent, or Firm* — Laurie A. Schlichter, PLLC

(57) ABSTRACT

A braking apparatus for stopping a children's kick scooter is described. The braking apparatus comprises a hand-held remote control to transmit a command signal when a radio-frequency (RF) signal transmitter is activated. The braking apparatus also comprises a remote control signal receiver located on the children's kick scooter to receive the command signal and convert it to an electric current. The braking apparatus additionally comprises a linear actuator to receive the electric current. The linear actuator comprises a linear actuator electric motor and a linear actuator shaft. The linear actuator electric motor is activated by the electric current and moves the linear actuator shaft from a first position to a second position. The braking apparatus further comprises a brake system to press a metal plate against a rear wheel of the children's kick scooter, thereby stopping the children's kick scooter when the linear actuator shaft is in the second position.

20 Claims, 11 Drawing Sheets

(51) Int. Cl.
  *B62L 3/00*   (2006.01)
  *G08C 17/02*  (2006.01)
  *B62L 1/04*   (2006.01)
  *B62K 3/00*   (2006.01)

(56) References Cited

U.S. PATENT DOCUMENTS

| | | | | |
|---|---|---|---|---|
| 2,262,433 | A * | 11/1941 | Uecker | B60B 33/021 |
| | | | | 188/68 |
| 3,066,764 | A * | 12/1962 | Kramesak, Jr. | B60B 33/021 |
| | | | | 188/74 |
| 5,383,536 | A * | 1/1995 | Butter | F16D 49/00 |
| | | | | 188/29 |
| 5,803,468 | A | 9/1998 | Petrucci | |
| 5,823,636 | A | 10/1998 | Parker | |
| 6,286,632 | B1 | 9/2001 | Chai | |
| 6,296,082 | B1 | 10/2001 | Tsai | |
| 6,435,528 | B1 | 8/2002 | Tsai | |
| 6,488,296 | B2 | 12/2002 | Ireton | |
| 6,619,416 | B2 | 9/2003 | Lan | |
| 9,045,189 | B2 | 6/2015 | Lovley | |
| 9,625,905 | B2 | 4/2017 | Rosenberg | |
| 10,189,533 | B2 | 1/2019 | Lovley | |
| 10,419,904 | B2 | 9/2019 | Lee | |
| 10,549,809 | B2 | 2/2020 | Kuo | |
| 10,588,814 | B1 | 3/2020 | Engel | |
| 2002/0020980 | A1 | 2/2002 | Lee | |
| 2002/0074756 | A1 | 6/2002 | Tsai | |
| 2002/0084612 | A1 | 7/2002 | Yeung | |
| 2007/0045976 | A1 | 3/2007 | Wu | |
| 2008/0114519 | A1 | 5/2008 | DuFaux | |
| 2008/0203691 | A1 | 8/2008 | Hsu | |
| 2010/0194187 | A1 | 8/2010 | Howard | |
| 2011/0278111 | A1 * | 11/2011 | Junk | F16D 49/00 |
| | | | | 188/74 |
| 2014/0091546 | A1 | 4/2014 | Lovley | |
| 2016/0090754 | A1 | 3/2016 | Mohamed | |
| 2016/0375347 | A1 * | 12/2016 | Stubberud | B60T 8/32 |
| | | | | 701/79 |
| 2019/0263468 | A1 | 8/2019 | Huang | |
| 2020/0130771 | A1 | 4/2020 | Jacobsz Rosier | |
| 2020/0172078 | A1 | 6/2020 | Graves | |

FOREIGN PATENT DOCUMENTS

| | | | | |
|---|---|---|---|---|
| FR | 2982498 | A1 * | 5/2013 | ............ A63C 17/02 |
| GB | 2446010 | A | 7/2008 | |
| WO | 02064420 | A1 | 8/2002 | |
| WO | WO-2008014927 | A1 * | 2/2008 | ............ F16D 65/18 |
| WO | 2017217936 | A1 | 12/2017 | |
| WO | 2018010297 | A1 | 1/2018 | |

OTHER PUBLICATIONS

Smart Brake multi-purpose technology. YouTube [online] [video] Rollersafe AS, May 20, 2020 [retrieved on Nov. 22, 2020]. Retrieved from the Internet: <URL: https://www.youtube.com/watch?v=VVMOoy1NuoM>.

Installed remote control brakes in my wife's scooter. YouTube [online] [video]. One Wheel Appeal, Jul. 6, 2020 [retrieved on Nov. 22, 2020]. Retrieved from the Internet: <URL: https://www.youtube.com/watch?v=n7Zc6Jm0CyQ>.

A Remote Control Brake That Stops a Kid's Bike in Its Path, [online], Andrew Liszewski, Apr. 24, 2014 [retrieved on Nov. 22, 2020], Retrieved from the Internet: <URL: https://gizmodo.com/a-remote-control-brake-that-stops-a-kids-bike-its-pa-1567042308>.

iBrake functions. YouTube [online] [video]. Dave Clarke, Jun. 2016 [retrieved on Nov. 22, 2020]. Retrieved from the Internet: <URL: https://www.youtube.com/watch?v=VBcswoXpTGo&feature=emb_logo>.

iBrake Remote Braking System for Kids Bikes, [online]. Dave Clarke, Jun. 17, 2016 [retrieved on Nov. 22, 2020]. Retrieved from the Internet: <URL: https://www.hackster.io/daveclarke/ibrake-remote-braking-system-for-kids-bikes-2a0bbe>.

Remote Bike Brake. YouTube [online] [video]. Joshua Lambert, May 7, 2012 [retrieved on Nov. 22, 2020]. Retrieved from the Internet: <URL: https://www.youtube.com/watch?v=iP2jgx9vU-s&feature=emb_logo>.

* cited by examiner

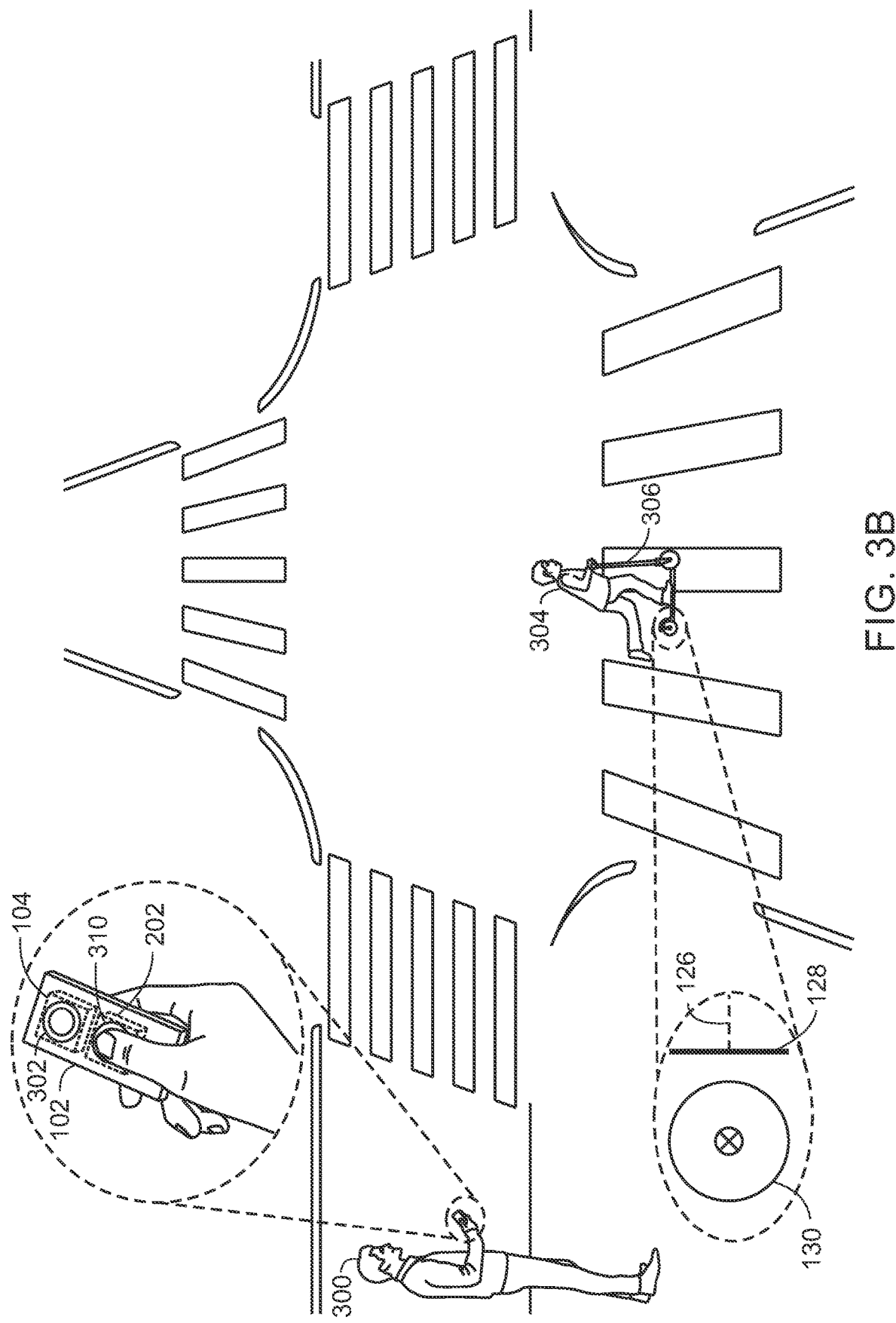

BRAKING APPARATUS FOR A CHILDREN'S KICK SCOOTER

TECHNICAL FIELD

The present disclosure relates generally to techniques for stopping a children's kick scooter when danger is imminent. More specifically, the present techniques relate to stopping a children's kick scooter using a remote-controlled braking apparatus.

BACKGROUND ART

Some children's kick scooters are equipped with a brake system that stops the scooter by pushing the rear fender against the rear wheel. To engage the brake system, a child has to step on a mechanism located on the footboard near the rear fender or on the rear fender itself. A young child has difficulty using this type of brake system. The young child may have to turn around to locate the mechanism before stepping on it. Alternatively, the young child may forego use of the brake system altogether. The young child may stop the kick scooter by jumping off it or dragging his or her foot alongside it.

BRIEF DESCRIPTION OF THE DRAWINGS

FIG. 3B is an illustration of the observer using the hand-held remote control to release the brake on the children's kick scooter.

The same numbers are used throughout the disclosure and the figures to reference like components and features. Numbers in the 100 series refer to components and figures originally found in FIG. 1; numbers in the 200 series refer to components and features originally found in FIG. 2; and so on.

DESCRIPTION OF THE EMBODIMENTS

Figure 1:
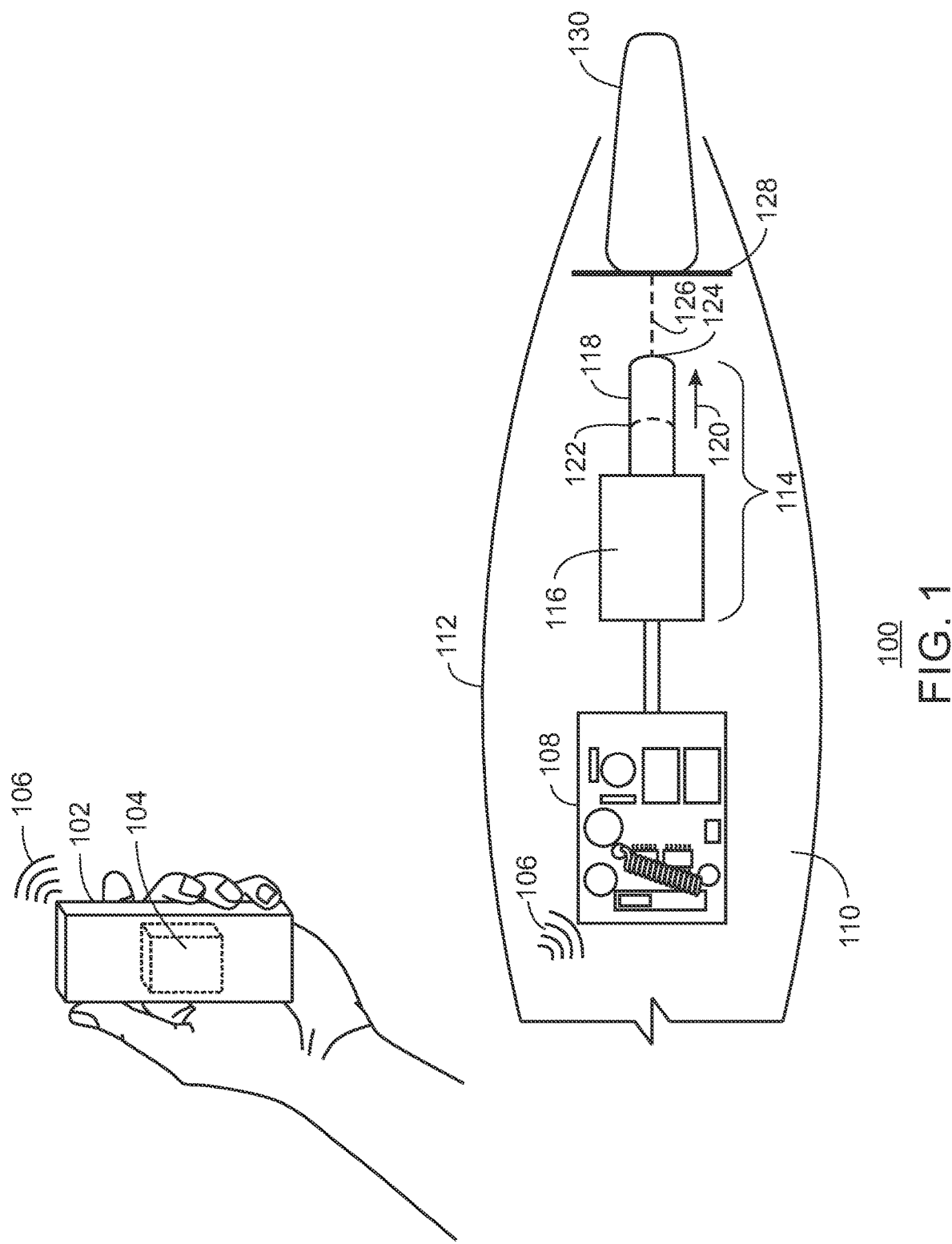
FIG. 1 is an illustration of a braking apparatus for stopping a children's kick scooter.

Young children riding kick scooters have a high risk of injury. There are several reasons for this. Their estimation of their own skills and strength is often inadequate which can lead them to believe they can stop a kick scooter when they cannot. Young children frequently lack the ability to properly assess an imminent hazardous situation which can cause them to underestimate or ignore the dangers they encounter when riding a kick scooter. In addition, their neuromuscular systems are not well developed making it difficult for them to stop the kick scooter they are riding.

The configuration of the brake system may be another reason that riding a kick scooter is so injurious to young children. For example, one type of brake system stops the kick scooter by forcing the rear fender against the rear wheel. The rear fender contacts and slows the rear wheel when the rider steps on a mechanism located on the rear fender itself or on the floorboard of the scooter near the rear fender. Stepping on the mechanism may be difficult for young children. They may not have the physical capability to step on the mechanism with enough force to push the rear fender against the rear wheel. Even if physically capable, a young child may have to turn around and locate the mechanism before stepping on it. Consequently, the child is no longer looking forward and may not see a dangerous situation in enough time to avoid it. Alternatively, the difficulty involved may discourage a young child from using the brake system. To stop the kick scooter, the young child may jump off the scooter or drag his or her foot alongside the scooter. These methods are not effective at stopping the kick scooter instantaneously. As a result, the young child may be unable to avoid a dangerous situation.

An adult may accompany a young child on a kick scooter in an attempt to keep the young child safe from harm. To accomplish this objective, the adult has to remain close to the young child. However, despite the adult's best efforts, the young child on the kick scooter may outdistance the adult. The young child may be separated from the adult to the extent that the young child is no longer in the adult's line of sight. This may have disastrous consequences. The young child may be abducted. Alternatively, the young child may enter an intersection and be hit by a vehicle. A device that enables an accompanying adult to control the scooter's brake is needed.

The present techniques allow the adult to stop the kick scooter using a hand-held remote control. The adult presses a button on the remote control, the rear wheel locks, and the kick scooter stops. The rear wheel remains locked until the adult unlocks it by pressing a second button on the hand-held remote control. Accordingly, the young child cannot move the scooter until the adult determines that it is safe for the young child to proceed.

The subject matter disclosed herein relates to techniques for stopping a children's kick scooter. The present disclosure describes techniques for applying the brake on a kick scooter using a hand-held remote control operated by an observer accompanying a young child on the scooter. For example, a hand-held remote control may transmit a command signal when a radio-frequency (RF) signal transmitter is activated. A remote control signal receiver located on the children's kick scooter may receive the command signal and convert it to an electric current. A linear actuator may receive the electric current and the electric current may activate a linear actuator electric motor. The linear actuator electric motor may move a linear actuator shaft from a first position to a second position. A brake system may press a metal plate against a rear wheel of the children's kick scooter causing the kick scooter to stop when the linear actuator shaft is in the second position. Various examples of the present techniques are described in detail below. Reference is made to the figures.

FIG. 1 is an illustration of a braking apparatus for stopping a children's kick scooter. As shown in FIG. 1, the braking apparatus 100 may include a hand-held remote control 102. The hand-held remote control 102 may enclose a first RF signal transmitter 104. When the first RF signal transmitter 104 is activated, the hand-held remote control 102 may transmit a first command signal 106.

The first command signal 106 may be received by a remote control signal receiver 108 located on the children's kick scooter. In an embodiment, the remote control signal receiver 108 may be attached to the underside 110 of a footboard 112. The remote control signal receiver 108 may convert the first command signal 106 to a first electric current.

A linear actuator 114 may receive the first electric current. As a result, a linear actuator electric motor 116 may rotate in a first direction. The rotation of the linear actuator electric motor 116 in the first direction may move a linear actuator shaft 118 in a first direction indicated by the arrow 120. In the embodiment shown, the linear actuator shaft 118 has lengthened; it has moved from a first position 122 to a second position 124.

When the linear actuator shaft 118 is in the second position 124, a brake system 126 may press a metal plate 128 against a rear wheel 130 of the children's kick scooter, thereby stopping the scooter. In FIG. 1, the brake system 126 is drawn as a dashed line that represents the various configurations of the brake system 126 discussed later in this disclosure.

Figure 2:
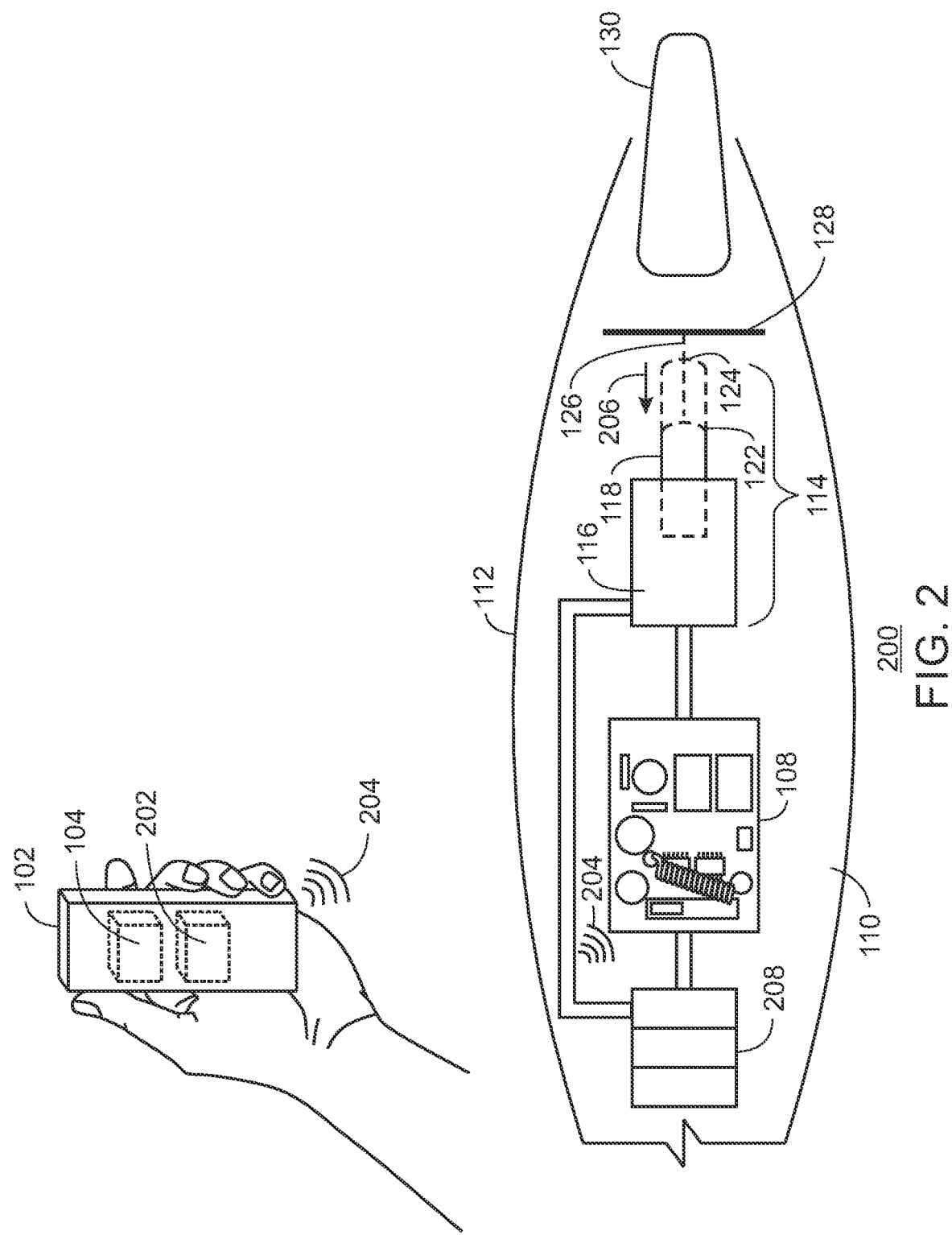
FIG. 2 is an illustration of the braking apparatus when movement of the children's kick scooter can resume.

FIG. 2 is an illustration of the braking apparatus when movement of the children's kick scooter can resume. As shown in FIG. 2, the braking apparatus 200 may include the hand-held remote control 102. The hand-held remote control 102 may enclose a second RF signal transmitter 202 in addition to the first RF signal transmitter 104. When the second RF signal transmitter 202 is activated, the hand-held remote control 102 may transmit a second command signal 204.

The second command signal 204 may be received by the remote control signal receiver 108 located on the children's kick scooter. In the embodiment shown, the remote control signal receiver 108 may be attached to the underside 110 of the footboard 112. The remote control signal receiver 108 may convert the second command signal 204 to a second electric current.

The linear actuator 114 may receive the second electric current. As a result, the linear actuator electric motor 116 may rotate in a second direction. The rotation of the linear actuator electric motor 116 in the second direction may move the linear actuator shaft 118 in a second direction indicated by the arrow 206. In the embodiment shown, the linear actuator shaft 118 has shortened; it has moved from the second position 124 to the first position 122.

When the linear actuator shaft 118 is in the first position 122, the brake system 126 may release the metal plate 128 from contact with the rear wheel 130 of the children's kick scooter. The rear wheel 130 is unlocked and may rotate freely. Consequently, the young child may once again move the kick scooter. In FIG. 2, the brake system 126 is drawn as a dashed line. As in FIG. 1, the dashed line represents the various configurations of the brake system 126 discussed later in this disclosure.

The linear actuator shaft 118 lengthens in FIG. 1 and shortens in FIG. 2. The opposite movements of the linear actuator shaft 118 may be attributed to the opposing nature of the first electric current and the second electric current. The first electric current may flow in a first direction and the second electric current may flow in a second direction opposite to the first direction. The first electric current with its first direction of flow may rotate the linear actuator electric motor 116 in a first direction. The second electric current with its second direction of flow may rotate the linear actuator electric motor 116 in a second direction opposite to the first direction. As it rotates in the first direction, the linear actuator electric motor 116 may move the linear actuator shaft 118 from the first position 122 to the second position 124. In other words, the linear actuator shaft 118 may lengthen as shown in FIG. 1. Conversely, as it rotates in the second direction, the linear actuator electric motor 116 may move the linear actuator shaft 118 from the second position 124 to the first position 122. Stated differently, the linear actuator shaft 118 may shorten as shown in FIG. 2. The linear actuator shaft 118 may move in opposite directions which allows it to push the metal plate 128 against the rear wheel 130 and subsequently release the metal plate 128 from contact with the rear wheel 130. As a result, the children's kick scooter may stop and then restart.

As shown in FIG. 2, the braking apparatus 200 may include a battery pack 208. The batteries in the battery pack 208 may supply electric power to the remote control signal receiver 108 and the linear actuator 114. The battery pack 208 may contain six-volt or twelve-volt batteries.

Figure 3A:
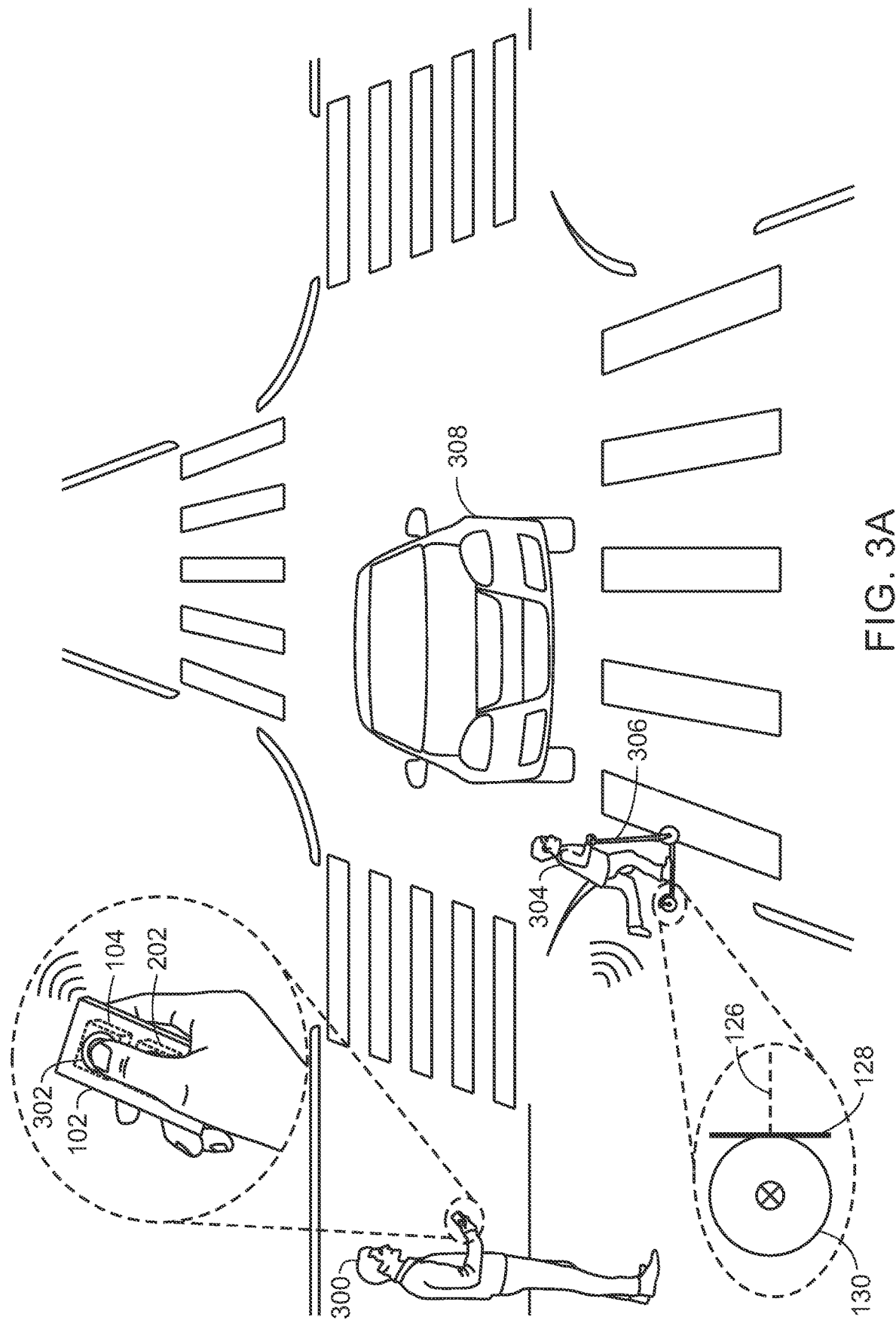
FIG. 3A is an illustration of an observer using a hand-held remote control to stop the children's kick scooter.

FIG. 3A is an illustration of an observer using a hand-held remote control to stop the children's kick scooter. In FIG. 3A, the young child 304 on the children's kick scooter 306 has reached the end of the sidewalk and entered the crosswalk. A vehicle 308 is approaching the crosswalk and will hit the young child 304 unless the children's kick scooter 306 is stopped. The young child 304 may be unable to stop in time to avoid colliding with the vehicle 308. The observer 300 realizes that the young child 304 is in imminent danger and presses a first button 302 on the remote control 102. When pressed, the first button 302 may activate the first RF signal transmitter 104.

The activation of the first RF signal transmitter 104 may cause the brake system 126 to press the metal plate 128 against the rear wheel 130 of the children's kick scooter 306. The rear wheel 130 may lock and cease to rotate which brings the children's kick scooter 306 to a stop before the young child 304 is hit by the oncoming vehicle 308. Further, the rear wheel 130 may remain locked which prevents the young child 304 from moving the children's kick scooter 306 until it is safe to do so.

The activation of the first RF signal transmitter 104 may result in a series of events that culminates in the stopping of the children's kick scooter 306. In an embodiment, the activation of the first RF signal transmitter may cause the hand-held remote control 102 to transmit a first command signal 106; the remote control signal receiver 108 may receive the first command signal 106, convert it to a first electric current, and send the first electric current to the linear actuator 114; the first electric current may cause the linear actuator electric motor 116 to rotate; the rotation of the linear actuator electric motor 116 may cause the linear actuator shaft 118 to lengthen as it moves from the first position 122 to the second position 124; the movement of the linear actuator shaft 118 may result in the brake system 126 pressing the metal plate 128 against the rear wheel 130; the rear wheel 130 may lock causing the children's kick scooter 306 to stop. This series of events is discussed in detail with reference to FIG. 1.

FIG. 3B is an illustration of the observer using the hand-held remote control to release the brake on the children's kick scooter. When the first button 302 on the hand-held remote control 102 is pressed, the children's kick scooter 306 may stop and remain stopped until the observer 300 presses the second button 310 on the hand-held remote control 102. In FIG. 3B, the vehicle 308 has passed through the intersection. The young child 304 is no longer in danger and can safely cross the street. Accordingly, the observer 300 presses the second button 310 on the hand-held remote control 102. Consequently, the rear wheel 130 may unlock as the brake system 126 moves the metal plate 128 away from the rear wheel 130 of the children's kick scooter 306. The young child 304 may once again move the children's kick scooter 306 and crosses the street.

The activation of the second RF signal transmitter 202 may result in a series of events that ends when the young child 304 continues to ride the children's kick scooter 306. In an embodiment, the activation of the second RF signal transmitter 202 may cause the hand-held remote control 102 to transmit a second command signal 204; the remote control signal receiver 108 may receive the second command signal 204, convert it to a second electric current, and send the second electric current to the linear actuator 114; the second electric current may cause the linear actuator electric motor 116 to rotate; the rotation of the linear actuator electric motor 116 may cause the linear actuator shaft 118 to shorten as it moves from the second position 124 to the first position 122; the movement of the linear actuator shaft 118 may result in the brake system 126 releasing the metal plate 128 from contact with the rear wheel 130; the rear wheel 130 may unlock causing the children's kick scooter 306 to move. This series of events is discussed in detail with reference to FIG. 2.

In the embodiments shown in FIGS. 1 to 3B, the brake system 126 is depicted as a dashed line. Any of the configurations of the brake system 126 illustrated in FIGS. 4 to 8B can be substituted for the dashed line. Only the configuration of the brake system 126 varies. The braking apparatus 100, 200 is otherwise unchanged.

Figure 4:
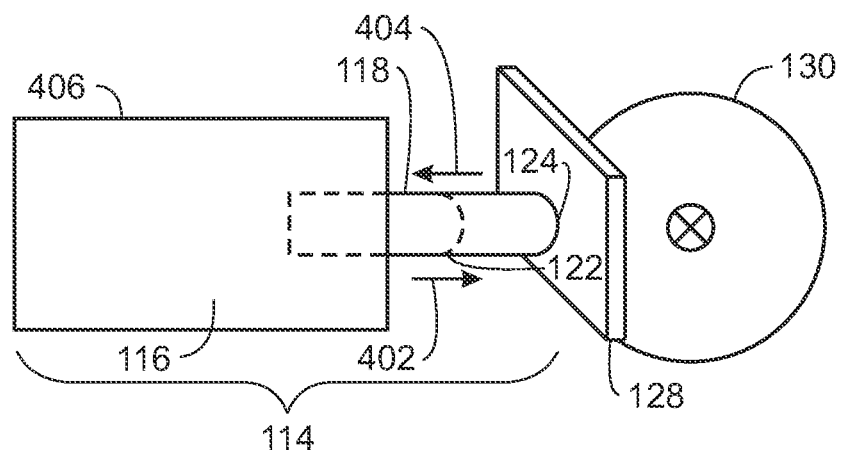
FIG. 4 is an illustration of a first configuration of the brake system.

FIG. 4 is an illustration of a first configuration of the brake system. In this configuration, the end of the linear actuator shaft 118 may attach to the middle of the metal plate 128. When the first button 302 on the hand-held remote control 102 is pressed, the end result may be movement of the linear actuator shaft 118 in a first direction indicated by the first arrow 402. The linear actuator shaft 118 may lengthen as it moves from the first position 122 to the second position 124. When the linear actuator shaft 118 is in the second position 124, the metal plate 128 may press against the rear wheel 130. The rear wheel 130 may lock causing the children's kick scooter 306 to stop.

To unlock the rear wheel 130, the second button 310 on the hand-held remote control 102 may be pressed. When the second button 310 is pressed, the end result may be movement of the linear actuator shaft 118 in a second direction indicated by the second arrow 404. The linear actuator shaft 118 may shorten as it moves from the second position 124 to the first position 122. When the linear actuator shaft 118 is in the first position 122, the metal plate 128 may no longer contact the rear wheel 130. The rear wheel 130 is no longer locked and the young child 304 may once again move the children's kick scooter 306.

Figure 5A:
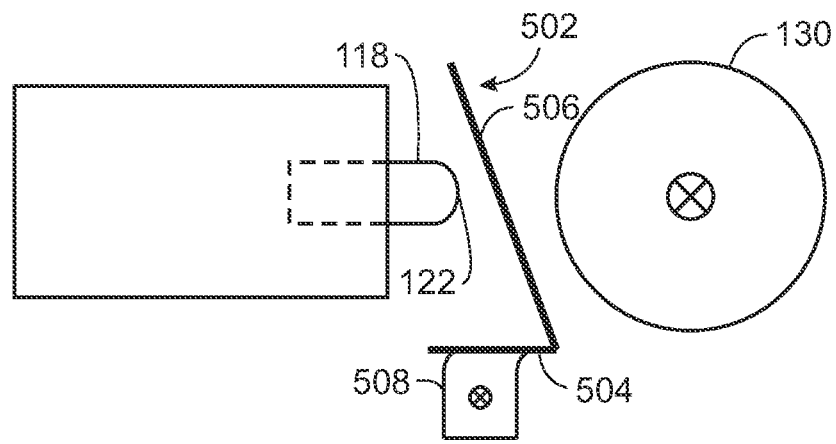
FIG. 5A is an illustration of a second configuration of the brake system when a linear actuator shaft is in a first position.

FIG. 5A is an illustration of a second configuration of the brake system when the linear actuator shaft is in the first position. The brake system may be a bent metal plate 502 that has a shorter portion 504 and a longer portion 506. Hardware 508 may prevent the shorter portion 504 from moving. The longer portion 506 may be located between the end of the linear actuator shaft 118 and the rear wheel 130. As shown in FIG. 5A, an edge of the metal plate 502 may resemble an upside down "7" when the linear actuator shaft 118 is in the first position 122. As such, the longer portion 506 may not contact the rear wheel 130 and the children's kick scooter 306 moves freely.

Figure 5B:
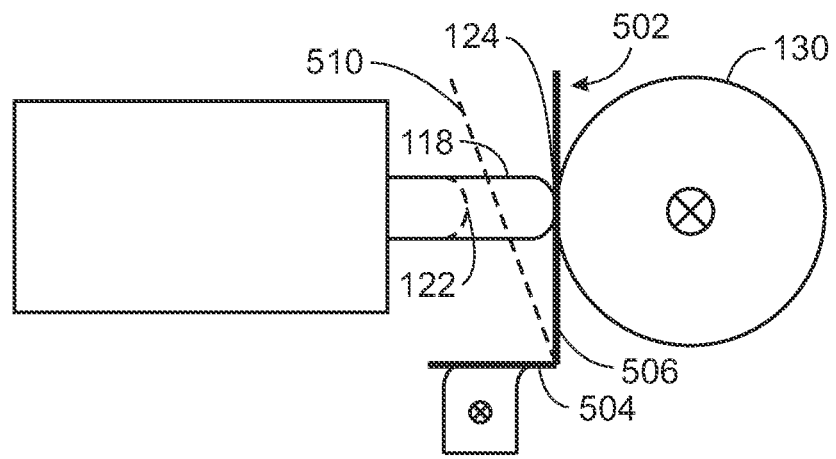
FIG. 5B is an illustration of the second configuration of the brake system when the linear actuator shaft is in a second position.

FIG. 5B is an illustration of the second configuration of the brake system when the linear actuator shaft is in the second position. The linear actuator shaft 118 may lengthen as it moves from the first position 122 to the second position 124. This movement may be triggered when the first button 302 on the hand-held remote control 102 is pressed. As it lengthens, the linear actuator shaft 118 may contact the longer portion 506 of the bent metal plate 502. The linear actuator shaft 118 may press against the longer portion 506 and move it toward the rear wheel 130. The longer portion 506 may contact the rear wheel 130 when the linear actuator shaft 118 is in the second position 124. As a result, the rear wheel 130 may lock which stops the children's kick scooter 306.

When the linear actuator shaft 118 is in the second position 124, the shorter portion 504 and the longer portion 506 of the bent metal plate 502 may be perpendicular to one other. As shown in FIG. 5B, the edge of the bent metal plate 502 may resemble a backward "L" when the longer portion 506 presses against the rear wheel 130. To return the longer portion 506 to its original position 510, the second button 310 on the hand-held remote control 102 may be pressed. The linear actuator shaft 118 may move from the second position 124 to the first position 122 and the longer portion 506 of the bent metal plate 502 may move away from the rear wheel 130. When the longer portion 506 is in its original position 510, the rear wheel 130 is no longer locked and the young child 304 may once again move the children's kick scooter 306.

Figure 6A:
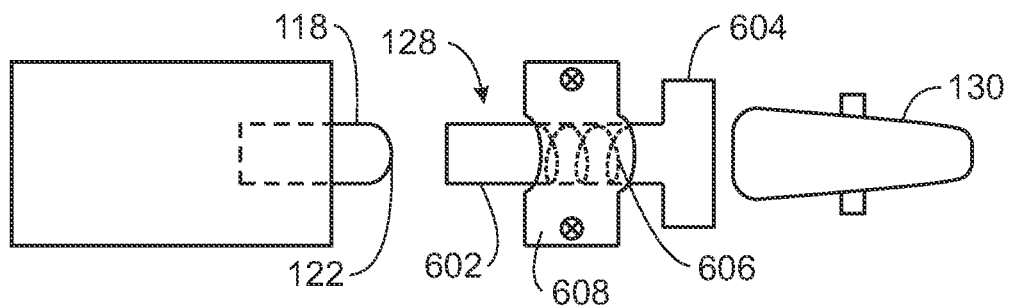
FIG. 6A is an illustration of a third configuration of the brake system when the linear actuator shaft is in the first position.

FIG. 6A is an illustration of a third configuration of the brake system when the linear actuator shaft is in the first position. The third configuration may include a metal plate 128 formed from a longer portion 602 and a crosspiece 604. As shown in FIG. 6A, the metal plate 128 may be shaped like a "T." Part of the longer portion 602 may be contained inside a spring 606 in a housing 608. The end of the linear actuator shaft 118 and an end of the longer portion 602 may be separated by a gap when the linear actuator shaft 118 is in the first position 122. The crosspiece 604 and the rear wheel 130 may be separated by a gap as well. As a result, the rear wheel 130 may rotate freely as the young child 304 propels the children's kick scooter 306.

Figure 6B:
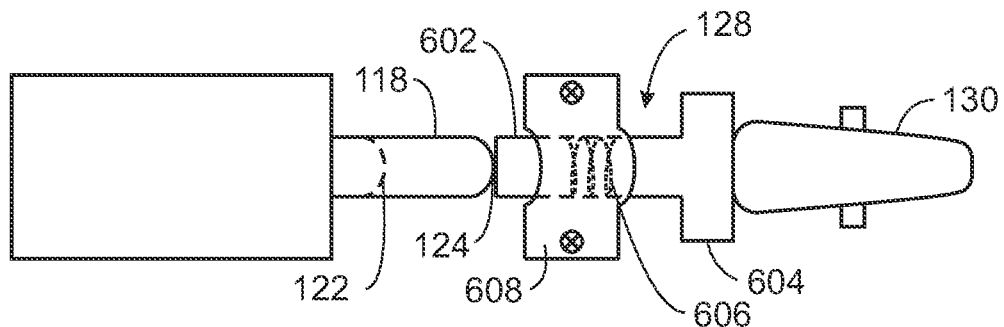
FIG. 6B is an illustration of the third configuration of the brake system when the linear actuator shaft is in the second position.

FIG. 6B is an illustration of the third configuration of the brake system when the linear actuator shaft is in the second position. The linear actuator shaft 118 may be moved from the first position 122 to the second position 124 by pressing the first button 302 on the hand-held remote control 102. As the linear actuator shaft 118 lengthens, it may press against the end of the longer portion 602 of the metal plate 128. The longer portion 602 may move causing the spring 606 to compress. The linear actuator shaft 118 may continue to push the longer portion 602 until the crosspiece 604 contacts the rear wheel 130. When the linear actuator shaft 118 is in the second position 124, there may be no gap between the end of the linear actuator shaft 118 and the end of the longer portion 602 and no gap between the crosspiece 604 and the rear wheel 130. While the crosspiece 604 is pushed against it, the rear wheel 130 is locked and the children's kick scooter 306 is immobilized.

The linear actuator shaft 118 may return to the first position 122 when the second button 310 on the hand-held remote control 102 is pressed. When the linear actuator shaft 118 moves, a gap may develop between the end of the linear actuator shaft 118 and the end of the longer portion 602. The linear actuator shaft 118 is no longer pressing against the end of the longer portion 602, the compressed spring 606 may lengthen, and the metal plate 128 may revert to the position shown in FIG. 6A. When the metal plate 128 is in this position, the crosspiece 604 may be separated from the rear wheel 130. The crosspiece no longer impedes the rotation of the rear wheel 130 and the children's kick scooter 306 is free to move.

The first, second, and third configurations of the brake system 126 are discussed with reference to FIGS. 4 to 6B. These configurations rely upon the lengthening of the linear actuator shaft 118 to stop the children's kick scooter 306. The fourth and fifth configurations of the brake system 126 are illustrated in FIGS. 7A to 8B. These configurations rely upon the shortening of the linear actuator shaft 118 to stop the children's kick scooter 306. Consequently, the first position of the linear actuator shaft 118 in FIGS. 4 to 6B becomes the second position of the linear actuator shaft 118 in FIGS. 7A to 8B and vice versa.

Figure 7A:
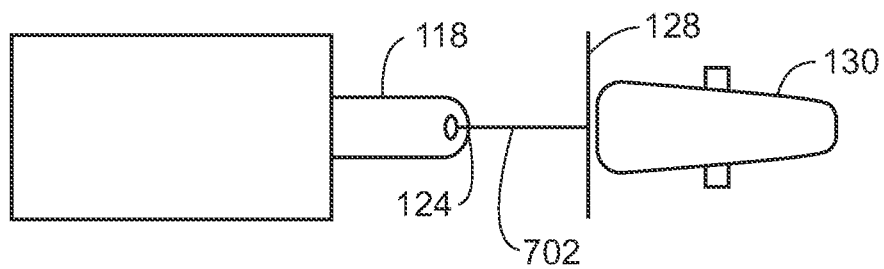
FIG. 7A is an illustration of a fourth configuration of the brake system when the linear actuator shaft is in the first position.

FIG. 7A is an illustration of a fourth configuration of the brake system when the linear actuator shaft is in the first position. In the embodiment shown in FIG. 7A, the end of the linear actuator shaft 118 may connect to an end of a metal rod 702. The other end of the metal rod 702 may attach to a first edge of the metal plate 128. The linear actuator shaft 118 is in the first position 124 and may be fully extended. There may be a gap between the metal plate 128 and the rear wheel 130. As such, the rear wheel 130 is unlocked and free to rotate.

Figure 7B:
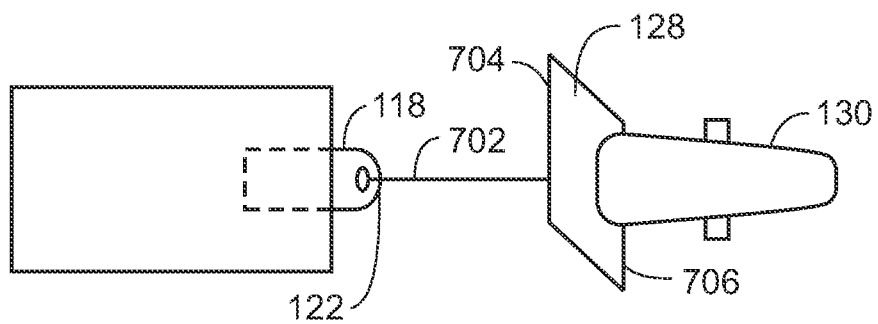
FIG. 7B is an illustration of the fourth configuration of the brake system when the linear actuator shaft is in the second position.

FIG. 7B is an illustration of the fourth configuration of the brake system when the linear actuator shaft is in the second position. The linear actuator shaft 118 may move from the first position 124 to the second position 122 when the first button 302 on the hand-held remote control 102 is pressed. The linear actuator shaft 118 may shorten as it moves from the first position 124 to the second position 122. As the linear actuator shaft 118 shortens, it may pull the metal rod 702 which may pull the first edge 704 of the metal plate 128. The first edge 704 may be free to move in the direction in which it is pulled. A second edge 706 of the metal plate 128 opposite the first edge 704 may move in the opposite direction toward the rear wheel 130. The second edge 706 may press against the rear wheel 130 and stop it from rotating. With its rear wheel 130 locked, the children's kick scooter 306 cannot move.

The second button 310 on the hand-held remote control 102 may be pressed to return the linear actuator shaft 118 to the first position 124. As the linear actuator shaft 118 lengthens, it may no longer pull the metal rod 702 which may no longer pull the first edge 704 of the metal plate 128. The first edge 704 may return to the position shown in FIG. 7A and the second edge 706 may move away from the rear wheel 130. With its rear wheel 130 unlocked, the children's kick scooter 306 is no longer immobilized.

A metal rod 702 serves as the brake system 126 in the embodiment shown in FIGS. 7A and 7B. The metal rod 702 pulls the first edge 704 of the metal sheet 128 to stop the children's kick scooter 306. In another embodiment, a metal cable may perform the same function when substituted for the metal rod 702.

Figure 8A:
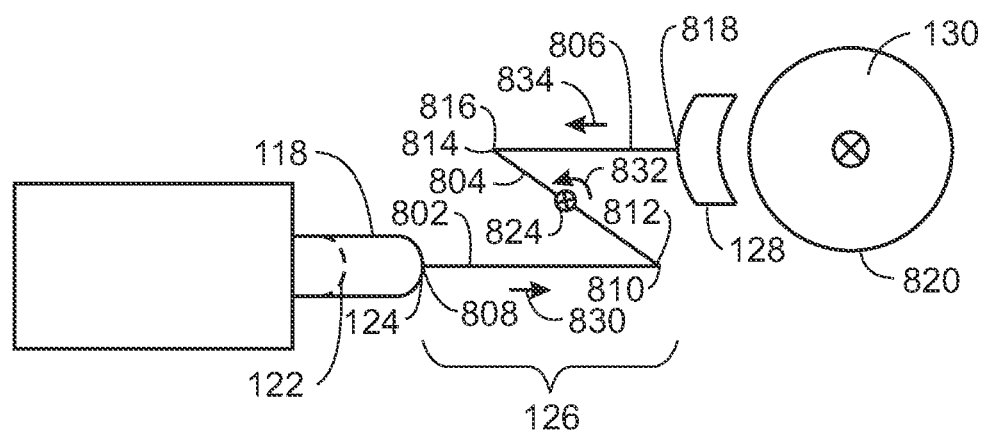
FIG. 8A is an illustration of a fifth configuration of the brake system when the linear shaft is in the first position.

FIG. 8A is an illustration of a fifth configuration of the brake system when the linear actuator shaft is in the first position. The brake system 126 may include a first rod 802, a second rod 804, and a third rod 806. A first end 808 of the first rod 802 may connect to the end of the linear actuator shaft 118 while an opposite end 810 of the first rod 802 may connect to a first end 812 of the second rod 804. An opposite end 814 of the second rod 804 may connect to a first end 816 of the third rod 806. An opposite end 818 of the third rod 806 may connect to the metal plate 128. In this embodiment, the metal plate 128 may conform to the outer surface 820 of the rear wheel 130.

The first rod 802 and the third rod 806 may be parallel to one another and separated by the transverse second rod 804. The first and third rods 802, 806 may overlap when the linear actuator shaft 118 is in the first position 124. When the brake system 126 is arranged this way, there is a gap between the metal plate 128 and the rear wheel 130.

Figure 8B:
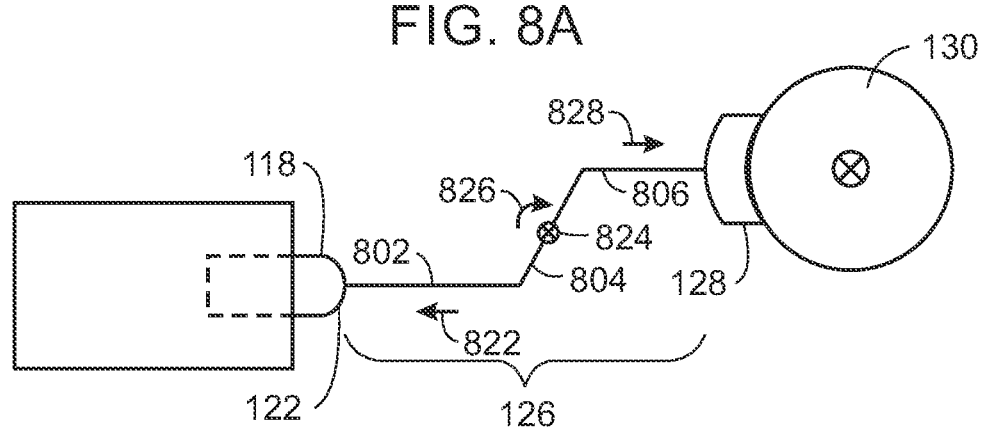
FIG. 8B is an illustration of the fifth configuration of the brake system when the linear actuator shaft is in the second position.

FIG. 8B is an illustration of the fifth configuration of the brake system when the linear actuator shaft is in the second position. The linear actuator shaft 118 may shorten by moving from the first position 124 to the second position 122 when the first button 302 on the hand-held remote control 102 is pressed. As the linear actuator shaft 118 shortens, the first rod 802 may be pulled in the direction indicated by the arrow 822. The movement of the first rod 802 may cause the second rod 804 to rotate about its midpoint 824 in the direction indicated by the curved arrow 826. The rotation of the second rod 804 may force the third rod 806 to move in the direction indicated by the arrow 828. As the third rod 806 moves, it may push the metal plate 128 against the rear wheel 130 causing the rear wheel 130 to lock. Consequently, the children's kick scooter 306 comes to a stop.

The second button 310 on the hand-held remote control 102 may be pressed to return the brake system 126 to the arrangement shown in FIG. 8A. As the linear actuator shaft 118 reverts to the first position 124, the first rod 802 may be pushed in the direction indicated by the arrow 830, the second rod 804 may rotate about its midpoint 824 in the direction indicated by the curved arrow 832, the third rod 806 may be pulled in the direction indicated by the arrow 834, and the metal plate 128 separates from the rear wheel 130. Once the rear wheel 130 is free to rotate, movement of the children's kick scooter 306 may resume.

Figure 9:
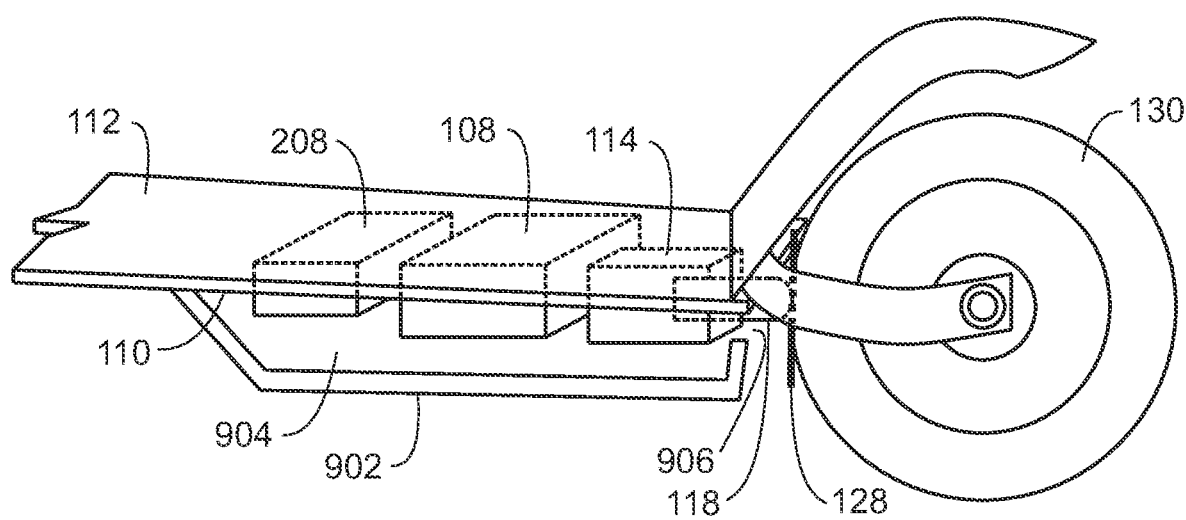
FIG. 9 is an illustration of a compartment that is located under the footboard of the children's kick scooter and contains most of the braking apparatus.

FIG. 9 is an illustration of a compartment located under the footboard of the children's kick scooter. In FIG. 9, a side of the compartment 902 has been removed to show the compartment's interior 904. The battery pack 208, the remote control signal receiver 108, and the linear actuator 114 attach to the underside 110 of the footboard 112 and may be enclosed by the compartment 902. As shown in FIG. 9, the compartment 902 may also enclose a first portion of the brake system 126.

Components of the various brake systems may be supported by the compartment 902. For example, the shorter portion 504 of the bent metal plate 502 shown in FIGS. 5A and 5B, the housing 608 that encloses the spring 606 shown in FIGS. 6A and 6B, and the midpoint 824 of the second rod 804 shown in FIGS. 8A and 8B may attach to a longer side of the compartment 902.

The side of the compartment 902 opposite the footboard 112 may be secured to the remaining sides of the compartment 902 when the children's kick scooter 306 is in use. However, this side may be removed to allow access to the components of the braking apparatus housed inside the compartment 902. The interior 904 of the compartment 902 may be entered when the enclosed components need to be repaired or replaced. For example, periodic replacement of the batteries in the battery pack 208 is required.

The compartment 902 may protect the components it houses. It may shield the enclosed components from environmental substances such as dirt, mud, water, or the like. In addition, the compartment 902 may safeguard the components from the impact that occurs when the children's kick scooter 306 runs over an object, a hole, a curb or the like.

The compartment 902 may have an opening 906 that allows a second portion of the brake system 126 to move in and out of the compartment 902 as the linear actuator shaft 118 shortens and lengthens. In the embodiment shown in FIG. 9, the brake system 126 has the first configuration depicted in FIG. 4. Accordingly, the end of the linear actuator shaft 118 may attach to the center of the metal plate 128. In other embodiments, the brake system 126 may have the second, third, fourth, or fifth configurations shown in FIGS. 5A to 8B.

In FIG. 9, the linear actuator shaft 118 may lengthen and its second-portion may pass through the opening 906 and move out of the compartment 902. As a consequence, the linear actuator shaft 118 may press the metal plate 128 against the rear wheel 130 and the children's kick scooter 306 stops. Movement of the kick scooter may not resume until the linear actuator shaft 118 shortens, its second portion passes through the opening 906 and moves into the compartment 902, and the metal plate 128 is pulled away from the rear wheel 130. Similarly, the brake systems shown in FIGS. 5A to 8B may have a second portion that moves in and out of the compartment 902 through the opening 906. As the second portion moves back and forth through the opening 906, the metal plate 128 may shift causing the rear wheel 130 to lock and unlock.

Figure 10A:
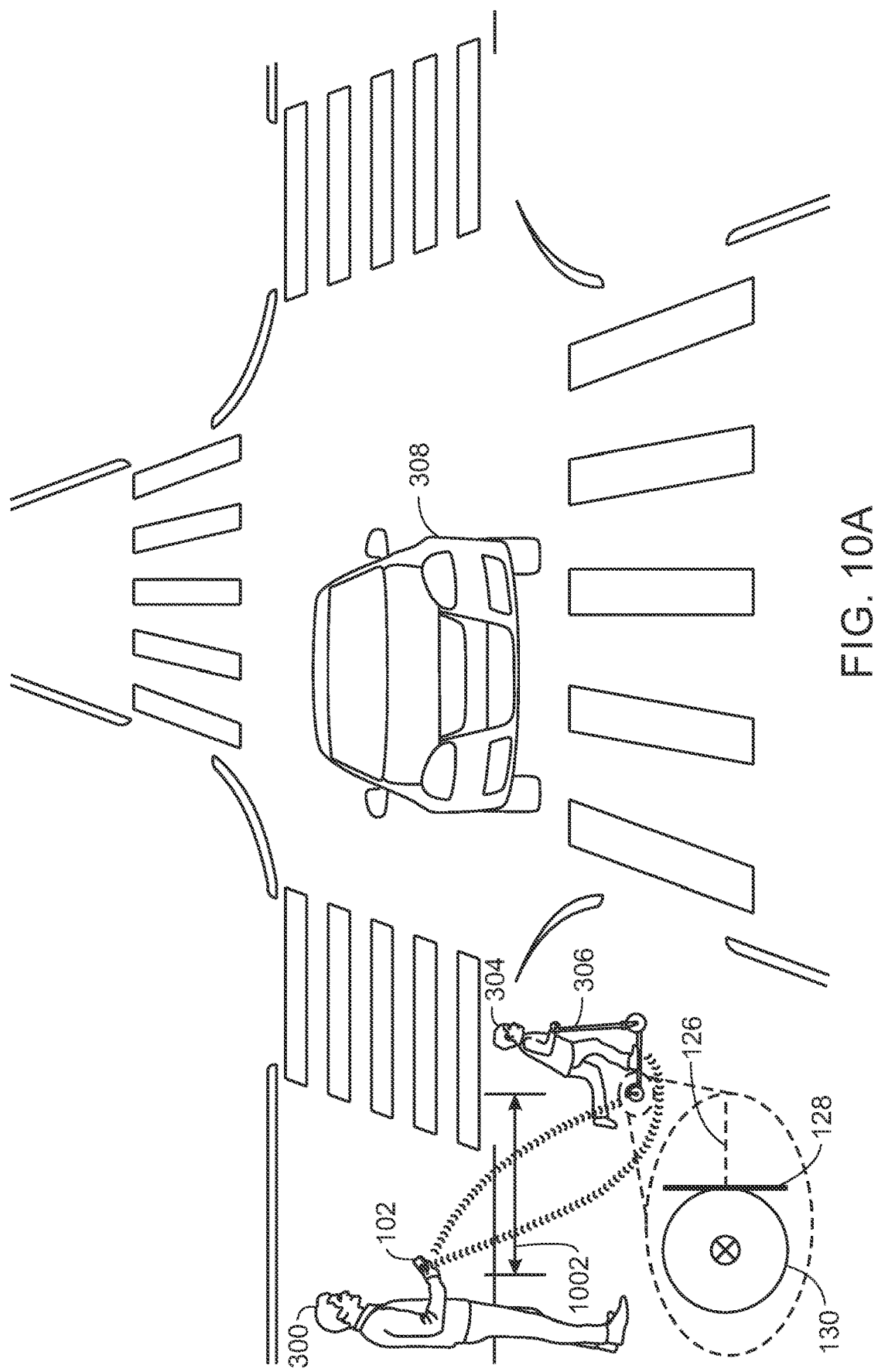
FIG. 10A is an illustration of a first automatic mode for stopping the children's kick scooter.

FIG. 10A is an illustration of a first automatic mode for stopping a children's kick scooter. The first automatic mode may stop the children's kick scooter 306 when the kick scooter reaches a pre-determined distance 1002 from the hand-held remote control 102. The first automatic mode may stop the children's kick scooter 306 before the young child 304 is too far from the observer 300 for the observer 300 to keep the young child 304 safe. The pre-determined distance 1002 may be chosen by the observer 300 using the distance selector depicted in FIG. 10B. In the embodiment shown in FIG. 10A, the distance selector is attached to the underside 110 of the footboard 112 and contained in the compartment 902.

Once the pre-determined distance 1002 has been entered by the observer 300, the distance selector may continuously monitor the distance between the children's kick scooter 306 and the hand-held remote control 102. The pre-determined distance 1002 and the distance between the children's kick scooter 306 and the hand-held remote control 102 may be compared by the distance selector. Once the two distances are the same, the distance selector may send a signal to the hand-held remote control 102. The signal may activate the first RF signal transmitter 104 which sends the first command signal 106 to the remote control signal receiver 108. A sequence of events is initiated when the remote control signal receiver 108 receives the first command signal 106 and may culminate when the brake system 126 moves the metal plate 128 against the rear wheel 130. The locking of the rear wheel 130 prevents the young child 304 from moving the children's kick scooter 306.

In the embodiment shown in FIG. 10A, the distance selector has stopped the children's kick scooter 306 at the pre-determined distance 1002 and the young child 304 can still be seen by the observer 300. A vehicle 308 is approaching the intersection and the observer 300 keeps the rear wheel 130 locked. The young child 304 cannot move into the intersection where he or she would collide with the oncoming vehicle 308. The young child 304 remains unharmed because the distance selector kept the young child 304 in the observer's line of sight.

Figure 10B:
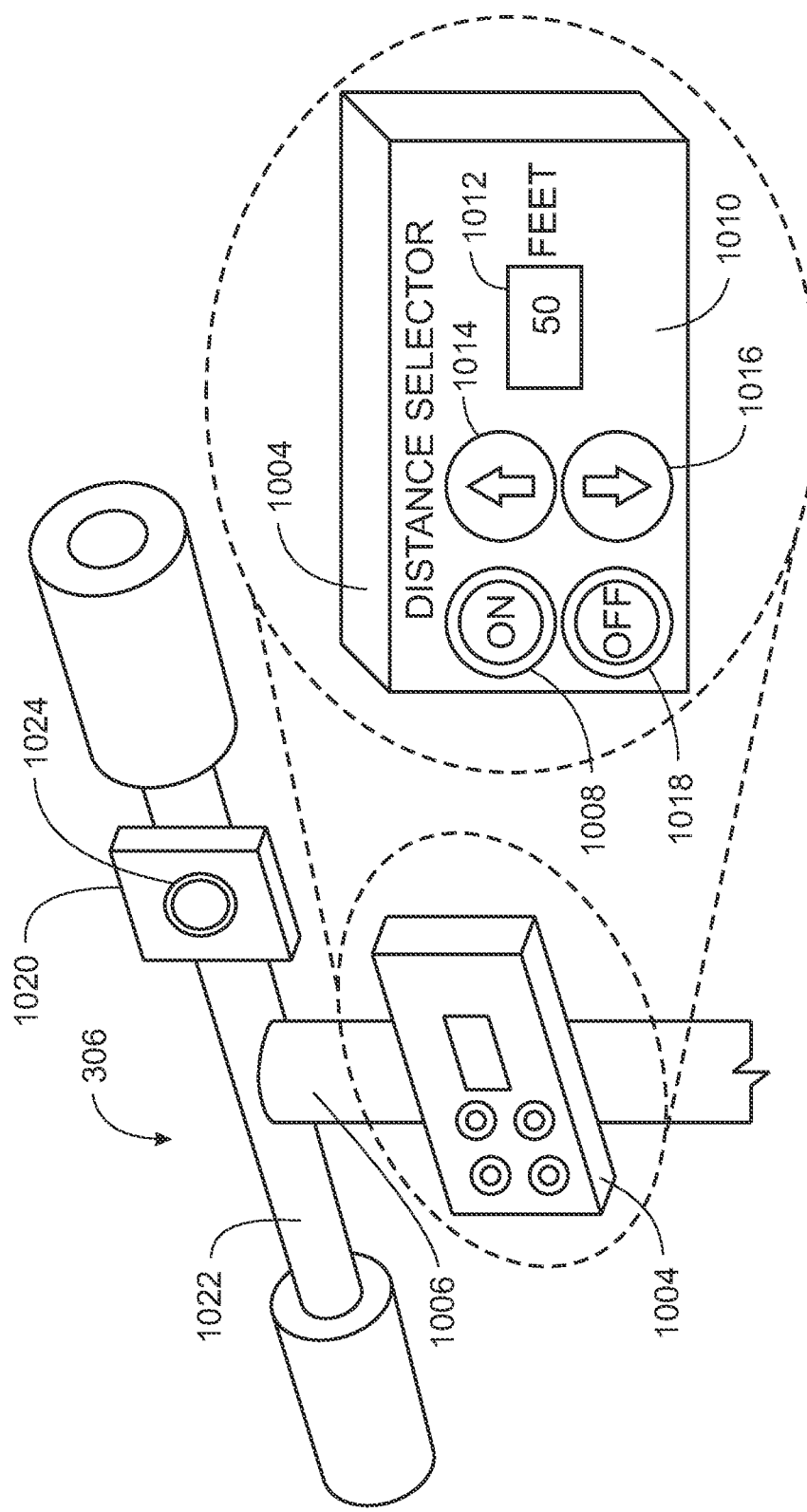
FIG. 10B is an illustration of a distance selector that stops the children's kick scooter when the kick scooter is operated in the first automatic mode.

FIG. 10B is an illustration of the distance selector that stops the children's kick scooter when the kick scooter is operated in the first automatic mode. In the embodiment shown in FIG. 10B, the distance selector 1004 is attached to a frame 1006 of the children's kick scooter 306. The first automatic mode may be activated by pressing the "On" button 1008 located on a front face 1010 of the distance selector 1004. A distance display 1012 may show the last pre-determined distance 1002 entered by the observer 300. The pre-determined distance 1002 may be increased by pressing the up-arrow button 1014 or decreased by pressing the down-arrow button 1016. The distance display 1012 may display the adjusted pre-determined distance. In FIG. 10B, the distance display 1012 indicates that the pre-determined distance 1002 is "50 Feet." The first automatic mode may cease to function when the "Off" button 1018 is pressed.

FIG. 10B also shows a single-button remote control 1020 attached to a handlebar 1022 on the children's kick scooter 306. In an embodiment, the children's kick scooter 306 may be stopped when the young child 304 presses the button 1024 on the single-button remote control 1020. The placement of the single-button remote control 1020 on the handlebar 1022 may enable the young child 304 to safely stop the children's kick scooter 306. The single-button remote control 1020 is prominently located and within the young child's reach. The young child 304 may not become distracted searching for the single-button remote control 1020. His or her attention may remain focused on the path ahead. In addition, the single-button remote control 1020 is located near the hand grip on the end of the handlebar 1022. The button 1024 may be pressed without the young child's hand having to leave the handlebar 1022. The steering of the children's kick scooter 304 does not become erratic as the young child 304 reaches for the button 1024. Further, the young child 304 does not have to turn around to apply the brake. He or she continues to face forward and may avoid a hazardous situation. In contrast, the young child 304 may unknowingly move toward a hazardous situation while turned around to locate a braking mechanism before stepping on it.

Pressing the button 1024 on the single-button remote control 1020 may have the same effect as pressing the first button 302 on the hand-held remote control 102. When either button is pressed, a sequence of events may be initiated. The sequence may end when the rear wheel 130 locks and the children's kick scooter 306 stops. The observer 300 may unlock the rear wheel 130 by pressing the second button 310 on the hand-help remote control 102. However, the young child 304 cannot unlock the rear wheel 130. The observer 300 is older and better able to assess the situation. He or she unlocks the rear wheel 130 and allows the young child 304 to proceed only when it is safe to do so.

Figure 11:
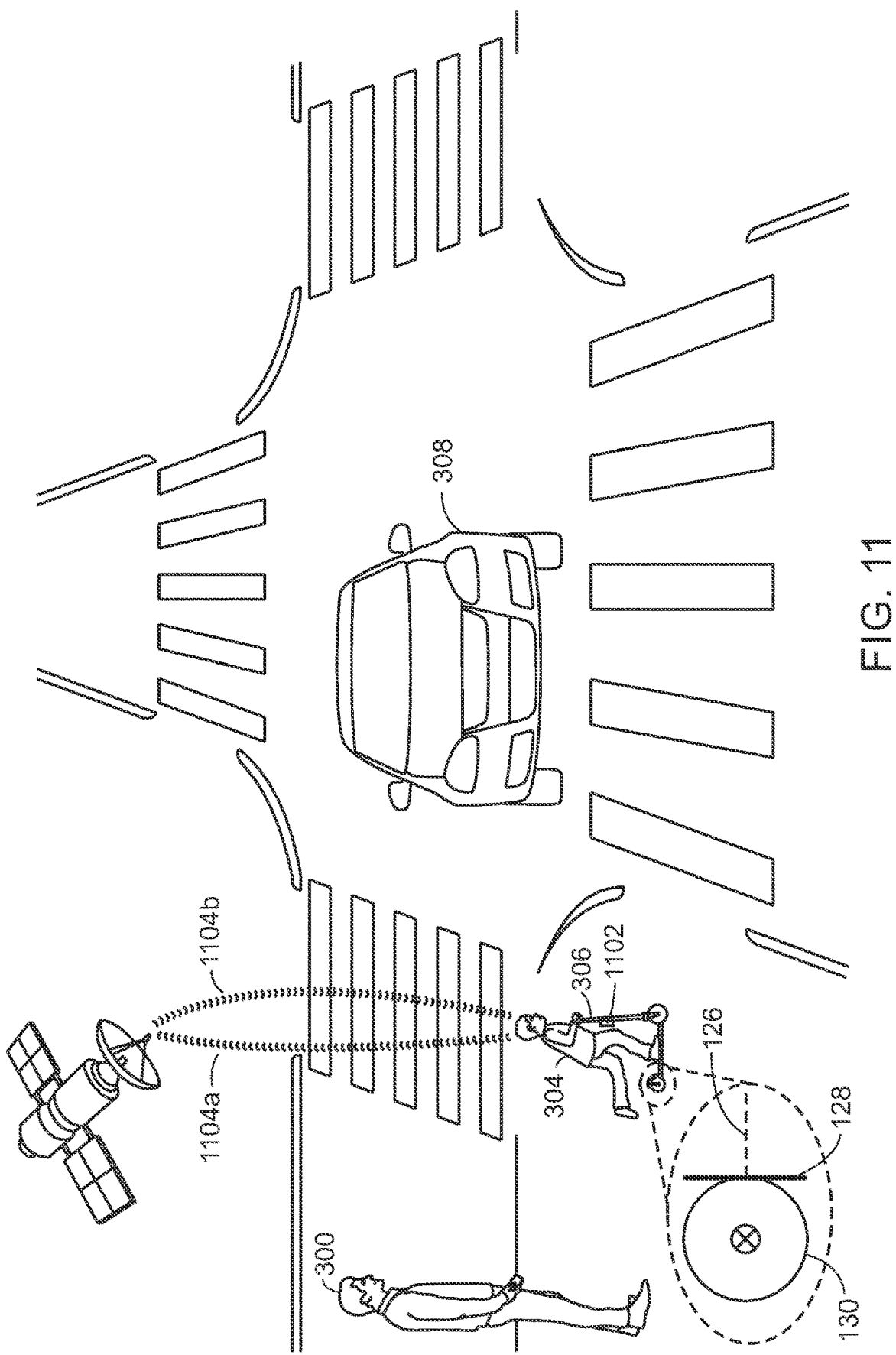
FIG. 11 is an illustration of a second automatic mode for stopping the children's kick scooter.

FIG. 11 is an illustration of a second automatic mode for stopping the children's kick scooter. A global positioning system (GPS) receiver 1102 may attach to the children's kick scooter 306. The GPS receiver 1102 locates at least three GPS satellites, determines the distance to each using a signal transmitted by the satellite, and calculates its own location using the distance to each of the at least three satellites. Only one satellite is shown in FIG. 11. The GPS receiver 1102 has located the satellite as indicated by line 1104a. The signal transmitted by the satellite is represented by line 1104b. Once its own location has been calculated, the GPS receiver 1102 may determine if the children's kick scooter 306 is approaching an intersection. If so, the GPS receiver 1102 may initiate a sequence of events that causes the brake system 126 to press the metal plate 128 against the rear wheel 130. In the embodiment shown in FIG. 11, the GPS receiver 1102 has stopped the children's kick scooter 306 before it entered the intersection. As a result, a collision with the oncoming vehicle 308 is avoided. The children's kick scooter 306 remains stopped until the observer 300 determines that is safe for the kick scooter to proceed and presses the second button 310 on the hand-held remote control 102. In the embodiment shown, the observer 300 would wait until the vehicle 308 has moved through the intersection before unlocking the rear wheel 130 by pressing the second button 310.

Figure 12:
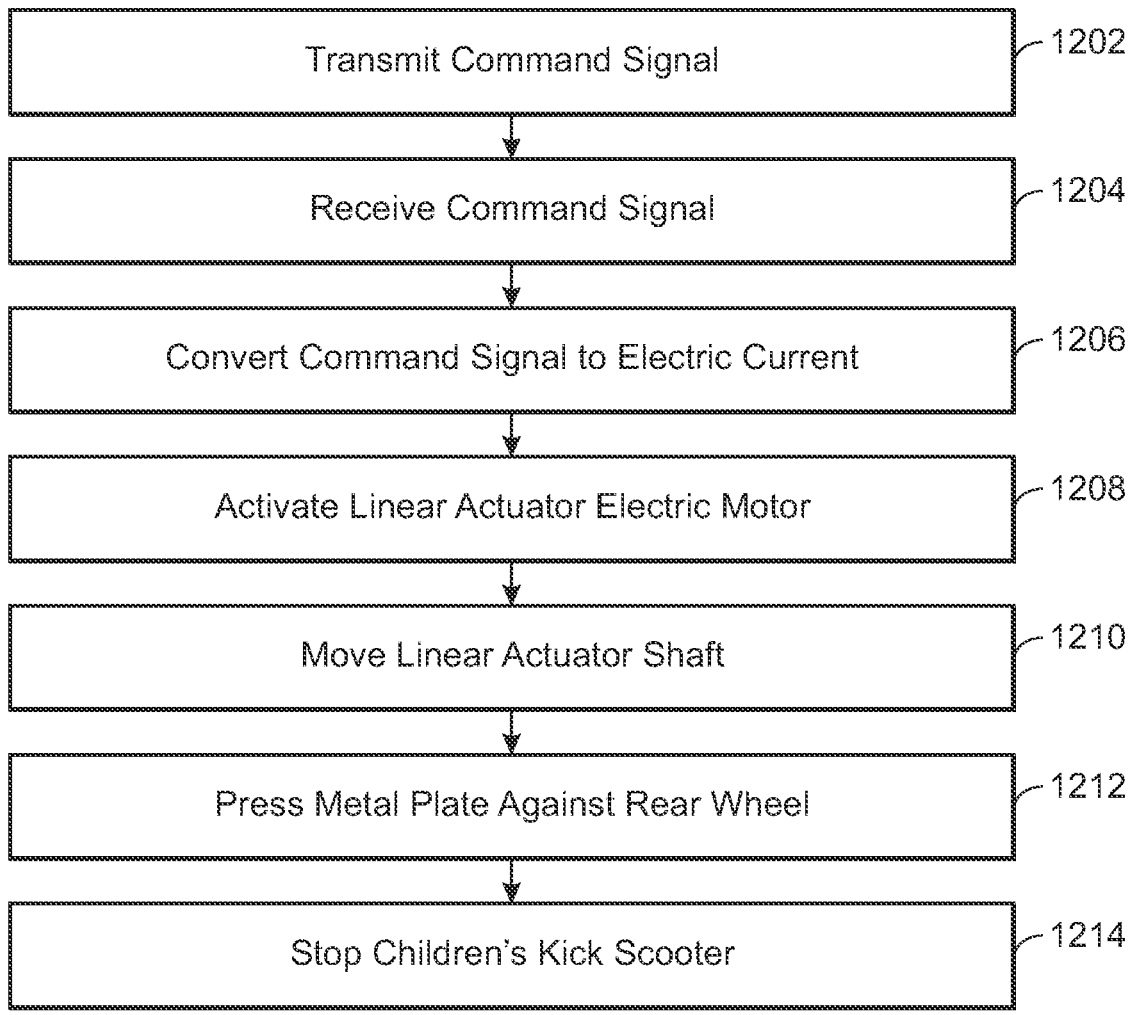
FIG. 12 is a process flow diagram of a method for stopping a children's kick scooter.

FIG. 12 is a process flow diagram of a method for stopping a children's kick scooter. The method 1200 may be performed by the apparatus 100 shown in FIG. 1. At block 1202, a command signal 106 may be transmitted by a radio-frequency (RF) signal transmitter 104. The command signal 106 may be transmitted when the RF signal transmitter 104 is activated by pressing a first button 302 on a hand-held remote control 102. At block 1204, the command signal 106 may be received by a remote control signal receiver 108 located on a children's kick scooter 306.

At block 1206, the remote control signal receiver 108 may convert the command signal 106 to an electric current. The remote control signal receiver 108 may send the electric current to a linear actuator 114 that includes a linear actuator electric motor 116 and a linear actuator shaft 118. At block 1208, the linear actuator electric motor 116 may be activated by the electric current and begins to rotate. At block 1210, the linear actuator shaft 118 may move as the linear actuator electric motor 116 rotates. The direction in which the linear actuator electric motor 116 rotates may determine whether the linear actuator shaft 118 shortens or lengthens.

At block 1212, a metal plate 128 may be pressed against the rear wheel 130 of the children's kick scooter 306. As the linear actuator shaft 118 shortens or lengthens, it may move a brake system 126 which moves the metal plate 128 toward the rear wheel 130. When the linear actuator shaft 118 stops moving, the metal plate 128 may contact the rear wheel 130 and lock it in place. The brake system 126 that connects the linear actuator shaft 118 and the metal plate 128 may have any of the configurations shown in FIGS. 4 to 8B. At block 1214, the children's kick scooter 306 may stop moving because the rear wheel 130 is locked. A dangerous situation may be avoided given that the young child 304 cannot move the immobilized kick scooter.

An embodiment is an implementation or example. Reference to "an embodiment," "present embodiment," "some embodiments," or "other embodiments" means that a particular function or feature is included in at least some embodiments, but not necessarily all embodiments. The various occurrences of "an embodiment" or "some embodiments" are not necessarily referring to the same embodiments.

Not all components, features, structures, characteristics, etc. described and illustrated herein need be included in a particular embodiment or embodiments. For example, if the specification states a component, feature, structure, or characteristic "may," "might," "can," or "could" be included, that particular component, feature, structure, or characteristic is not required to be included. If the specification or claims refer to "a" or "an" element, that does not mean there is only one of the element. If the specification or claims refer to "an additional" element, that does not preclude the possibility that there may be more of the additional element.

Some embodiments have been described in reference to particular implementations. However, other implementations are possible. The implementations of the present techniques are not limited to those disclosed herein. Additionally, the arrangement of the features and the sequence of the functions described above or illustrated in the drawings need not be arranged or sequenced in the particular way described or illustrated. Other arrangements or sequences are possible.

Elements shown in the drawings may have the same reference number or different reference numbers to suggest that the elements could be similar or different. However, an element may be flexible enough to be present in some or all of the implementations described above or shown in the drawings. Which element is referred to as a "first element" and which is referred to as a "second element" is arbitrary.

Details of an aforementioned example may apply to one or more embodiments. Further, the embodiments of the present techniques are not limited to those embodiments described herein or shown in the drawings. A process flow diagram has been used herein to illustrate an embodiment. However, the present techniques are not limited to the diagram or the corresponding description. For example, the process exemplified in the diagram need not progress through each box shown or in exactly the same order as illustrated.

The present techniques are not restricted to the particular details described herein. Those skilled in the art having the benefit of this disclosure will appreciate that many other variations of the foregoing description and accompanying drawings are possible and remain within the scope of the present techniques. Accordingly, the scope of the present techniques is defined by the following claims and any amendments thereto.

What is claimed is:

1. A braking apparatus for stopping a children's kick scooter, comprising:
   a hand-held remote control to transmit a first command signal when a first radio-frequency (RF) signal transmitter is activated;
   a remote control signal receiver to receive the first command signal and convert the first command signal to a first electric current, wherein the remote control signal receiver is located on the children's kick scooter;
   a linear actuator to receive the first electric current, wherein the first electric current is to activate a linear actuator electric motor and the linear actuator electric motor is to move a linear actuator shaft from a first position to a second position; and a brake system to pull a first edge of a metal plate connected to an end of the linear actuator shaft via a metal rod and push a second edge opposite the first edge of said metal plate against a rear wheel of the children's kick scooter when the linear actuator shaft is in the second position.

2. The braking apparatus of claim 1, wherein:
the hand-held remote control is to transmit a second command signal when a second RF signal transmitter is activated;
the remote control signal receiver is to receive the second command signal and convert the second command signal to a second electric current;
the linear actuator is to receive the second electric current, wherein the second electric current is to activate the linear actuator electric motor and the linear actuator electric motor is to move the linear actuator shaft from the second position to the first position; and
the brake system is to push the first edge of said metal plate and pull the second edge of said metal plate away from the rear wheel of the children's kick scooter when the linear actuator shaft is in the first position.

3. The braking apparatus of claim 1, comprising a battery to supply electric power to the remote control signal receiver and the linear actuator.

4. The braking apparatus of claim 3, wherein the battery comprises a six-volt battery or a twelve-volt battery.

5. The braking apparatus of claim 1, wherein the hand-held remote control comprises a first button and a second button, the first button activates the first RF signal transmitter when pressed, and the second button activates the second RF signal transmitter when pressed.

6. The braking apparatus of claim 5, wherein:
an observer accompanies the child on the children's kick scooter and presses the first button on the hand-held remote control when the child on the children's kick scooter nears a hazardous condition, wherein the second edge of said metal plate is pushed against the rear wheel of the children's kick scooter and
the observer presses the second button on the hand-held remote control when the child on the children's kick scooter avoids the hazardous condition, wherein the second edge of said metal plate is pulled away from the rear wheel of the children's kick scooter.

7. The braking apparatus of claim 1, wherein a remote control with a single button attaches to a handlebar on the children's kick scooter and the second edge of said metal plate is pushed against the rear wheel of the children's kick scooter when the single button is pressed.

8. The braking apparatus of claim 1, wherein:
the brake system comprises said metal plate attached to the end of the linear actuator shaft;
said metal plate presses against the rear wheel of the children's kick scooter when the linear actuator shaft is in the second position; and
said metal plate is released from the rear wheel when the linear actuator shaft is in the first position.

9. The braking apparatus of claim 1, wherein:
the brake system comprises a first rod, a second rod, a third rod, and said metal plate conformed to an outer surface of the rear wheel of the children's kick scooter;
a first end of the first rod connects to the end of the linear actuator shaft, a second end of the first rod is connected to a first end of the second rod, a second end of the second rod is connected to a first end of the third rod, and a second end of the third rod connects to said metal plate;
the first rod and the third rod are parallel and the second rod is transverse to the first rod and the third rod;
the first rod is pulled, the second rod rotates about a midpoint in a first direction, and the third rod pushes said metal plate against the rear wheel of the children's kick scooter when the linear actuator shaft is in the second position; and
the first rod is pushed, the second rod rotates about the midpoint in a second direction opposite to the first direction, and the third rod pulls said metal plate away from the rear wheel when the linear actuator shaft is in the first position.

10. The braking apparatus of claim 1, wherein a compartment is to attach to an underside of a footboard on the children's kick scooter; the compartment is to house the battery, the remote control signal receiver, the linear actuator, and a first portion of the brake system; and a second portion of the brake system is to move in and out of the compartment through an opening in the compartment, wherein said metal plate moves away from and toward the rear wheel of the children's kick scooter.

11. The braking apparatus of claim 1, comprising a first automatic mode to stop the children's kick scooter when the child on the children's kick scooter reaches a pre-determined distance from the hand-held remote control.

12. The braking apparatus of claim 11, wherein the observer sets the pre-determined distance using a distance selector attached to a frame of the children's kick scooter.

13. The braking apparatus of claim 1, comprising a second automatic mode to determine a location of the children's kick scooter and stop the children's kick scooter when the child on the children's kick scooter nears an intersection, wherein the location of the children's kick scooter is determined by a global positioning system (GPS) receiver attached to the children's kick scooter.

14. A method for stopping a children's kick scooter, comprising:
transmitting a command signal using a radio-frequency (RF) signal transmitter enclosed in a hand-held remote control;
receiving the command signal and converting the command signal to an electric current using a remote control signal receiver, wherein the remote control signal receiver is located on the children's kick scooter;
activating a linear actuator electric motor using the electric current;
moving a linear actuator shaft using the linear actuator electric motor;
pulling a first edge of a metal plate connected to an end of the linear actuator shaft via a metal rod and pushing a second edge opposite the first edge of the metal plate against a rear wheel of the children's kick scooter when the linear actuator shaft is in a second position; and
pushing the first edge of the metal plate and pulling the second edge opposite the first edge of the metal plate away from the rear wheel of the children's kick scooter when the linear actuator shaft is in a first position.

15. The method of claim 14, wherein transmitting a command signal using a radio-frequency (RF) signal transmitter enclosed in a hand-held remote control comprises pressing a button on the hand-held remote control.

16. The method of claim 15, wherein an observer watches a child on the children's kick scooter and presses the button on the hand-held remote control when the child on the children's kick scooter nears a hazardous condition.

17. A braking apparatus for stopping a children's kick scooter, comprising:
- a hand-held remote control to transmit a first command signal when a first radio-frequency (RF) signal transmitter is activated;
- a remote control signal receiver to receive the first command signal and convert the first command signal to a first electric current, wherein the remote control signal receiver is located on the children's kick scooter;
- a linear actuator to receive the first electric current, wherein the first electric current is to activate a linear actuator electric motor and the linear actuator electric motor is to move a linear actuator shaft from a first position to a second position; and
- a brake system to push a longer portion of a bent metal plate against a rear wheel of the children's kick scooter when the linear actuator is in the second position, wherein a shorter portion of the bent metal plate is prevented from moving.

18. The braking apparatus of claim 17, wherein:
- the hand-held remote control is to transmit a second command signal when a second RF signal transmitter is activated;
- the remote control signal receiver is to receive the second command signal and convert the second command signal to a second electric current;
- the linear actuator is to receive the second electric current, wherein the second electric current is to activate the linear actuator electric motor and the linear actuator electric motor is to move the linear actuator shaft from the second position to the first position; and
- the brake system is to release the longer portion of the bent metal plate from the rear wheel when the linear actuator shaft is in the first position.

19. A braking apparatus for stopping a children's kick scooter, comprising:
- a hand-held remote control to transmit a first command signal when a first radio-frequency (RF) signal transmitter is activated;
- a remote control signal receiver to receive the first command signal and convert the first command signal to a first electric current, wherein the remote control signal receiver is located on the children's kick scooter;
- a linear actuator to receive the first electric current, wherein the first electric current is to activate a linear actuator electric motor and the linear actuator electric motor is to move a linear actuator shaft from a first position to a second position; and
- a brake system to push an end of a longer portion inside a housing that partially encloses the longer portion, a spring inside the housing compresses to obtain a compressed spring, and a crosspiece affixed to the longer portion presses against a rear wheel of the children's kick scooter when the linear actuator shaft is in the second position.

20. The braking apparatus of claim 19, wherein:
- the hand-held remote control is to transmit a second command signal when a second RF signal transmitter is activated;
- the remote control signal receiver is to receive the second command signal and convert the second command signal to a second electric current;
- the linear actuator is to receive the second electric current, wherein the second electric current is to activate the linear actuator electric motor and the linear actuator electric motor is to move the linear actuator shaft from the second position to the first position; and
- the brake system is to separate from the end of the longer portion, the compressed spring lengthens, the end of the longer portion moves outside the housing, and the crosspiece is released from the rear wheel when the linear actuator shaft is in the first position.

* * * * *